(12) United States Patent
Raynal et al.

(10) Patent No.: US 8,128,072 B2
(45) Date of Patent: Mar. 6, 2012

(54) DEFLECTING SYSTEM FOR COLUMN TRAYS

(75) Inventors: Ludovic Raynal, Oullins (FR);
Anne-Claire Lucquin,
Saint-Maurice-l'Exil (FR)

(73) Assignee: IFP, Cedex (FR)

( * ) Notice: Subject to any disclaimer, the term of this patent is extended or adjusted under 35 U.S.C. 154(b) by 1116 days.

(21) Appl. No.: 11/956,895

(22) Filed: Dec. 14, 2007

(65) Prior Publication Data

US 2008/0156746 A1    Jul. 3, 2008

(30) Foreign Application Priority Data

Dec. 14, 2006 (FR) ..................................... 06 11046

(51) Int. Cl.
    *B01F 3/04* (2006.01)
(52) U.S. Cl. .................. 261/114.1; 261/114.5
(58) Field of Classification Search ............... 261/114.1, 261/114.2, 114.3, 114.4, 114.5
    See application file for complete search history.

(56) References Cited

U.S. PATENT DOCUMENTS

| | | | | |
|---|---|---|---|---|
| 2,681,219 A * | 6/1954 | Thrift et al. | ................. | 261/114.3 |
| 2,809,821 A * | 10/1957 | Constantikes | ............. | 261/114.4 |
| 3,362,696 A * | 1/1968 | Vaughan | ..................... | 261/114.1 |
| 3,887,665 A * | 6/1975 | Mix et al. | ..................... | 261/114.1 |
| 4,105,723 A * | 8/1978 | Mix | .............................. | 261/105 |
| 4,556,522 A | 12/1985 | Wilson | | |
| 5,223,183 A * | 6/1993 | Monkelbaan et al. | ..... | 261/114.1 |
| 5,885,488 A * | 3/1999 | Konijn | ......................... | 261/79.2 |
| 6,293,528 B1 | 9/2001 | Monkelbaan et al. | | |
| 6,902,154 B2 * | 6/2005 | Bosmans et al. | ........... | 261/114.1 |
| 7,004,988 B2 * | 2/2006 | Letzel | ............................. | 55/444 |
| 7,204,477 B2 * | 4/2007 | Xu et al. | ..................... | 261/114.1 |
| 7,445,200 B2 * | 11/2008 | Lee et al. | ................... | 261/112.2 |
| 7,648,128 B2 * | 1/2010 | Lee et al. | ................... | 261/114.1 |
| 2004/0099970 A1 | 5/2004 | Zich et al. | | |

FOREIGN PATENT DOCUMENTS

| | | |
|---|---|---|
| DE | 156776 | 6/1903 |
| FR | 2 355 538 | 1/1978 |
| GB | 828655 | 2/1960 |
| GB | 1 143 131 | 2/1969 |
| GB | 734759 | 8/1995 |
| SU | 615941 | 7/1978 |
| SU | 858854 | 8/1981 |
| WO | WO 99/26718 | 6/1999 |
| WO | WO 01/43844 | 6/2001 |

* cited by examiner

*Primary Examiner* — Charles Bushey
(74) *Attorney, Agent, or Firm* — Antonelli, Terry, Stout & Kraus, LLP.

(57) ABSTRACT

A gas-liquid contact column tray has a section including a gas pathway (SAA) and a liquid pathway section (SD) delimited by at least one downspout, wherein a deflecting system including a roof is included, located above the liquid gas interface at the level of the liquid pathway section (SD), in order to apportion the gas phase over a surface section greater than the section including the means of gas pathway (SAA). In a method for gas-liquid contact in such a column, most of the gas phase part is redirected and apportioned over the whole pathway section available for gas, corresponding to the tray section provided with the gas pathway (SAA), increased by the liquid pathway section (SD), using a deflecting system consisting of the roof located higher than the gas-liquid interface level of the liquid pathway section (SD), and the liquid collected is evacuated toward the lower tray.

10 Claims, 3 Drawing Sheets

DEFLECTING SYSTEM FOR COLUMN TRAYS

TECHNICAL CONTENT SUMMARY OF THE INVENTION

The invention concerns a column tray provided with a deflecting system for the gas phase in gas-liquid contact columns, and one gas-liquid contact column equipped with at least one tray according to the invention. The invention also concerns an improved separation method for gas-liquid contact tray columns, using the gas phase deflecting system.

TECHNICAL DOMAIN

The technical domain of the invention is for processing all stack effluents, or liquid hydrocarbonated load, namely natural gas processing, $CO_2$ capture, and distillation or reactive distillation. "Deflecting System" (SD) means a system for modifying the orientation and the distribution of a gaseous or liquid flowing on a contact column section.

"Roof" has the sense of any means used for at least partially blocking the sky located above the SD downspout section. The roof can be in the shape of a plate or any other adequate forms.

"Baffle" means a deflecting plate including notably a main bottom part and a bent shorter upper part in relation with the main bottom part.

OBJECT OF THE INVENTION

The invention concerns a column tray comprising a gas deflecting system provided to reorient gas flow and to distribute it on a surface section above the conventional gas pathway section by means of a roof located above the liquid downspout. The system can advantageously be positioned on an existing column.

The invention also concerns a method for putting gas-liquid in contact using at least one column tray for gas-liquid contact according to the invention. The invention also relates to a column for putting gas-liquid in contact including at least one tray according to the invention.

PRIOR ART

General Principle

In the columns under consideration (distillation, gas treatment, gas washing), the objective is to engage the gas to be treated with a liquid to encourage the transfer of material between the gas (or vapor phase) and the liquid.

During gas distillation, reactive distillation, treatment or washing processes, mass and heat transfers between a gas phase and a liquid phase are performed using technologies, called contactors, which favor such transfers, generally by counter-flow circulation in columns (gas ascending and liquid descending). Three are three main types of contactors: bulk packings, structured packings, and column trays.

Columns tray for gas distillation, washing, or treatment columns have been developed over the years and their dimensionality is well established with regards to standard trays (i.e. see Engineering Data Sook edited by Gas Processors Association, 1998). In order to optimize column dimensionality, the main ways for improving column tray focus on either their efficiency, or their capacity.

These last years, development efforts have focused particularly on increasing capacity by different means.

A capacity gain allows for larger flow to pass, of either gas, liquid, or both. This capacity gain provides a flow gain at constant column diameter, by replacing the existing contactors by new, more capacitive contactors (revamp case) which can save building a new column; or it may provide a gain on the column diameter in case of a new installation. In both cases, an investment saving is expected. Sometimes a capacity gain also entails an operating cost gain. Indeed, in some gas washing processes, the good operation of the contactor is secured by a minimal liquid flow rate value per surface unit. Using a more capacitive contactor then enables, at a given gas flow rate, to reduce the column diameter. The liquid flow rate per surface unit being kept constant, the total liquid flow decreases. The operating costs associated with liquid circulation are thus decreased.

One of the main means studied is placing an equipment enabling droplet separation under the tray; it can be, i.e., a structured packing or a liquid eliminator type of equipment (see document US2004/0099970).

Many patents describe the addition of deflecting plates for improving tray performances. According to the specific application, two designs are at the origin of adding deflecting plates.

A primary objective is to distribute the gas phase so that it directs the liquid phase and improves the out-flow and exchanges in the gas/liquid emulsion phase (documents GB 734,759; SU858854, SU615941), or at least improves the liquid out-flow on the tray (U.S. Pat. No. 4,556,522, GB 828655), by means of longitudinal plates in relation to the flow direction or with an appreciably horizontal end part.

Another objective is, on the other hand, to stop the droplets carried away with the liquid through impact effect (WO99/26718, WO01/43844, DE156776). Improving capacity is thus done either by direct reorientation of the liquid flow in liquid phase or in mixed phase, or by liquid flow reorientation using notably the gas, in order to avoid side effects.

This invention concerns a column tray improvement, seeking to increase column trays capacity particularly by orienting the gas flow in privileged directions above the emulsion zone or the gas-liquid contact zone ((4) in FIG. 1).

DESCRIPTION OF THE INVENTION

Invention Summary

The invention concerns a gas-liquid contact column tray consisting of a SD liquid pathway section delimited by at least one downspout, and a section including SAA gas pathway means, which consist of a deflecting system comprising a roof above the SD section, in order to distribute the gas phase over a surface section superior to the section including the SAA gas pathway means.

Preferably, the whole roof is located above the gas liquid interface.

The deflecting system may consist of a plurality of extended deflecting plates located above the downspout level, of which one plate forms said roof. Preferably, the deflecting plates and/or the roof are tilted from vertical.

In one mode of embodiment according to the invention, the roof and/or the deflecting plates are shaped as baffles including a main bottom part and a shorter bent top.

The invention also concerns a method for gas-liquid contact in column that consists of the following steps:

a liquid and gas out-flow is set countercurrent through at least one gas-liquid contact tray comprising a SD liquid pathway section delimited by at least one downspout and one section, including means of SAA gas pathway;

Most of the gas phase part is redirected and distributed over the totality of the pathway section available for gas and corresponding to the tray section provided with means of SAA gas pathway increased by the SD liquid pathway section, using a deflecting system including a roof above the SD liquid pathway section;

the liquid collected is evacuated toward the lower tray.

In one form of embodiment, most of gas phase part is redirected using a plurality of elongated deflecting plates placed higher than the downspout level, of which one plate forms said roof.

Advantageously, the flow redirection is completely done in gas phase.

Gas distribution may be improved using a droplet separation type mattress or a thin layer packing placed just above the roof and/or plates.

Finally, the invention concerns a gas-liquid contact column including at least one column tray according to the invention.

DESCRIPTION OF THE FIGURES

This invention provides an operating optimization for distillation or reactive absorption or gas washing column in which a gas, G, is put in contact with a countercurrent flowing liquid, L. The liquid is descending while the gas is ascending.

Figure 1:
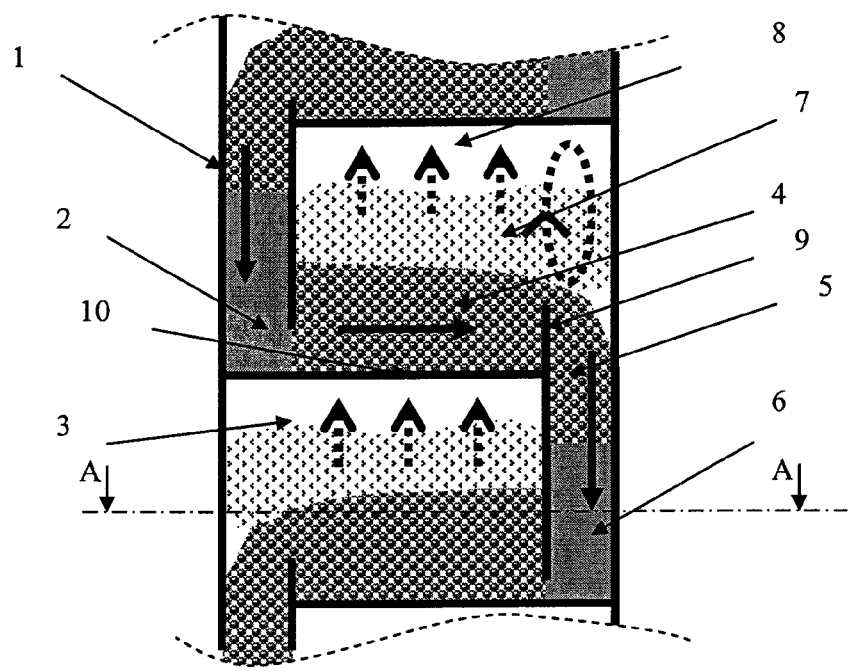
FIG. 1 represents a schematic circuit diagram a prior art column, where only three trays are shown.

As represented in FIG. 1 (current state of the art) said columns (1) are equipped with many trays (10) over which contact is made between the gas (arrows in dotted bold lines) and liquid (arrows in continuous bold lines) phases. The liquid drops from the upper tray via a down-pour chimney (2), spills on tray (10) on which a liquid level is retained via a dam at the end of downspout tray (9). This liquid retaining zone (4) is crossed by gas coming from zone (3) located underneath the contact tray. Zone (4) is a place of important bubbling encouraging mass and heat transfer between gas and liquid. Both phases once in put in contact must then be separated. The gas continues its ascending course through a mist zone (7) within which dragged droplets of liquid fall back in transfer zone (4).

The gas then reaches another zone (8) where no droplet is dragged; then the gas can reaches the upper tray through valves or any other means of gas pathway on the tray. The liquid itself overflows above a dam to fall into downspout (9).

A first mixing zone (5) is present at the level of the downspout sky. This zone section should be such that it enables phase separation, i.e. the gas bubbles carried away are able to go back up toward the top part, whereas the liquid continues to descend towards the lower tray, crossing a clear liquid zone in the downspout bottom (6) without any gas carried away.

Figure 2:
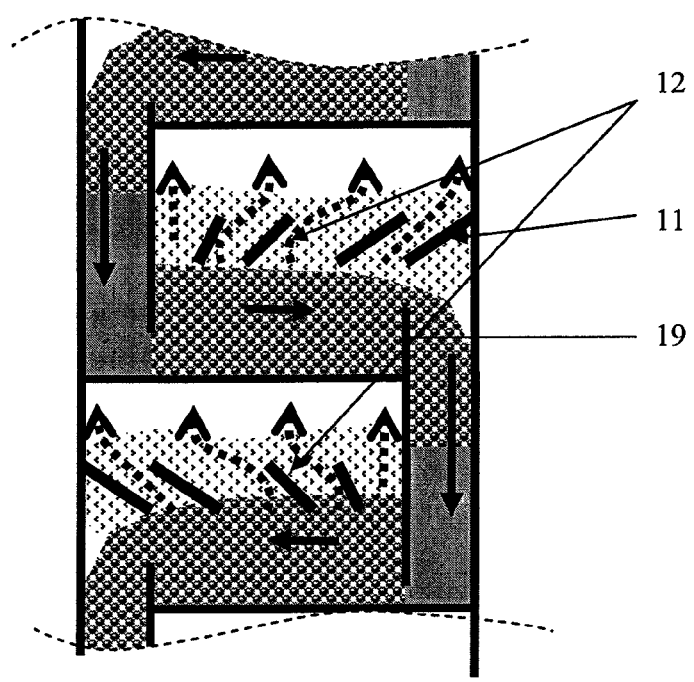
FIG. 2 represents the schematic circuit diagram of a column equipped with a deflecting system according to this invention comprising a roof and a system of appreciably parallel deflecting plates.

This invention (FIG. 2) consists in attaching a roof (11) above the section delimited by downspout (19) and possibly other parallel deflecting plates (12) above the open liquid flow surface on the tray. These tilted plates, which may take all appropriate shape, notably baffles as previously defined, have for object to canalize and to distribute the gas phase over the whole pathway section available to gas.

Figure 3:
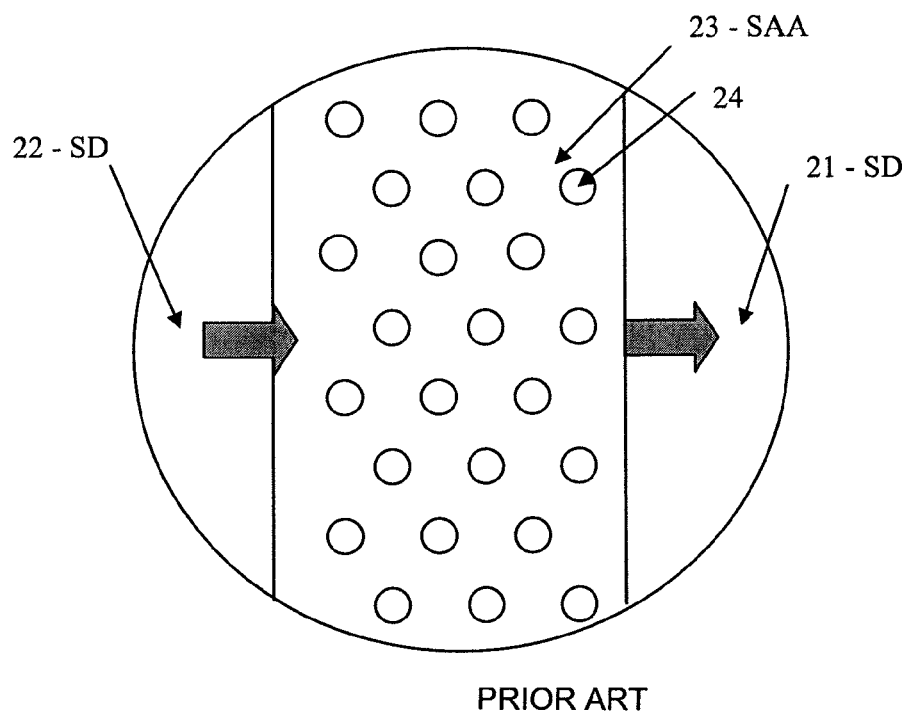
FIG. 3 represents a cross-section following AA in FIG. 1 (column from the prior art) showing the section distribution; pathway section corresponding to the spillways, SD, and pathway section corresponding to the active area, SAA.

Indeed, given a tray n, the useful pathway section for gas phase corresponds to the active area section, SAA (23), provided with means of gas pathway (24) (FIG. 3). Placing a roof according to the invention and possibly other deflecting plates over a tray n, enables the gas to apportion and distribute over a total surface corresponding to the active area section SAA, and the area section above the SD downspout (FIG. 3: SD area corresponding to tray n+1; (22), SD area corresponding to tray n in the gas out-flow direction: (21)). Such distribution provides for a lesser gas local speed in zones (7) and (8) (FIG. 1). Some of the droplets formed at the gas/liquid interface above the active area are carried away by the gas, they usually separate from the gas phase in disengagement zone ((7), FIG. 1) in a gas out-flow characterized by a gas speed $Ug\_{prior\ art}$ given by formula:

$$Ug\_{prior\ art} = Qg/SAA \quad (I)$$

where Qg corresponds to the gas volumic flow. In order to not to carry any drops away to the upper tray (a phenomenon called obstructing or flooding), which causes a degradation of column performance, this speed needs to be less than a critical gas speed, $UG\_{critical}$, beyond which droplets are carried away, i.e.

$$Ug < UG\_{critical} \quad (II)$$

By redistributing the gas over the section corresponding to {SAA+SD} the Ug computation is modified and becomes:

$$Ug = Ug\_{current\ invention} = Qg/(SAA+SD) \quad (III)$$

Therefore, this redistribution enables to pass more gas outflow while respecting equation (II) criteria.

Therefore, this invention allows for a capacity gain in terms of gas flow in case of a revamp (desire to pass more flow in an existing column) or a column size gain (case of a new column design). It also provides, but to a lesser extent, for a larger liquid flow to pass. Indeed, the greater stirring from the increased liquid flow, leads to a droplet formation increase at the interface. However, for a given gas out-flow, this greater droplet formation will be compensated by the good separation of droplet/vapor phase due to the additional plates.

Implementing at least one column tray including the deflecting system according to the invention enables therefore a flow redirection mostly in gas phase, preferably completely in gas phase. This good redistribution avoids local overspeeding, and therefore provides for passing a total flow larger than with prior art. It is comparatively easier and less expensive to implement than a packing.

Figure 4:
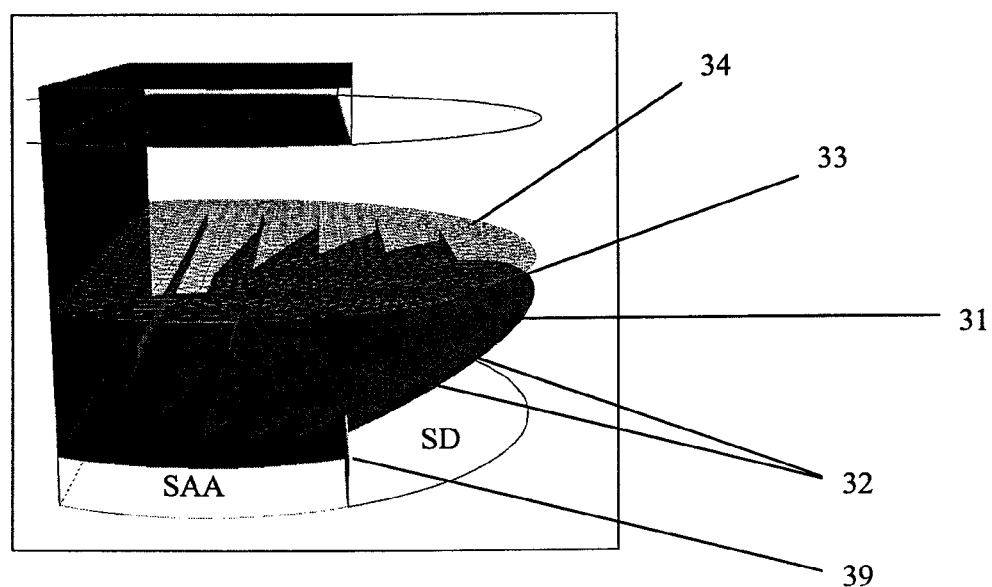
FIG. 4 represents a view in 3 dimensions of a deflecting system mode of embodiment according to the invention, consisting of a roof and deflecting plates with a droplet separation system placed just above the deflecting system.

FIG. 4 illustrates a particular form of embodiment of the invention. In addition to its redistribution role, the deflecting system formed by roof (31) and additional plate deflecting (32), presents other advantages. Indeed, its presence offers a significant impact surface where droplets, pulled from the gas/liquid interface, may come to crash. The droplets having a greater inertia than the vapor phase are not able to completely follow the change in vapor phase trajectory induced by the presence of plate(s); therefore they are going to crash onto these plates. The impact of these drops generates a liquid film that is running along the plates and then falling down in the tray. Since it is much more difficult for a gas flow to pull out droplets from a liquid film than to transport isolated droplets, the liquid film formation is also favorable for separating droplets from the gas phase out-flow.

Deflecting plates (32) may take all appropriate shapes, notably baffles previously defined as having a bent top (33) in relation to the main part; their purpose is to canalize and distribute the gas phase over the whole pathway section available to gas. Finally, a droplet separator type mattress or a thin layer packing (34) placed just above plates (32) can be added to this deflecting system (FIG. 4). This equipment shall also improve the efficacy of phase separation and vapor phase redistribution.

The deflecting system according to the invention can be applied to any existing tray, namely a perforated tray with fixed or mobile valves.

EXAMPLE

Computational Liquid Dynamics (CFD or Out-flow Numerical Simulation) performed with Fluent version 6.2 commercial software enables to model the redistributing effect of the deflecting plate system according to the invention on a 0.94 m diameter column, with a gas kinetic factor Fs of 1.1.

The gas kinetic factor is defined as follows
$F_s = \sqrt{P_g} \cdot V_{sg}$ where Pg designates the gas mass density in kg/m3, and Vsg the gas superficial speed in m/s.

Figure 5:
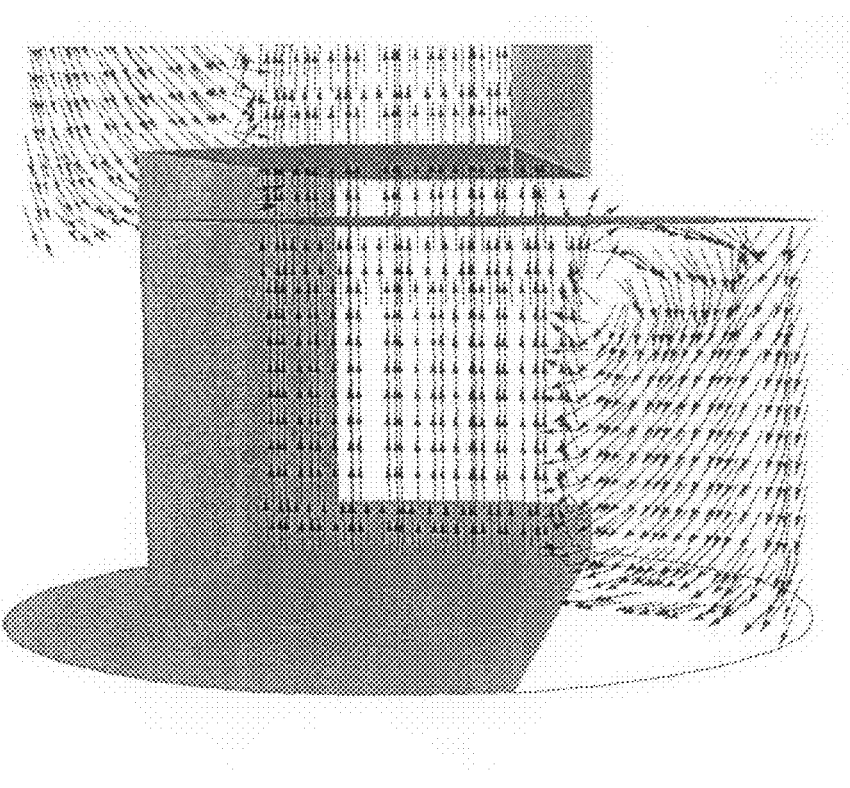
FIG. 5 represents the result of an out-flow simulation of the flows without the gas deflecting system according to the invention.
Figure 6:
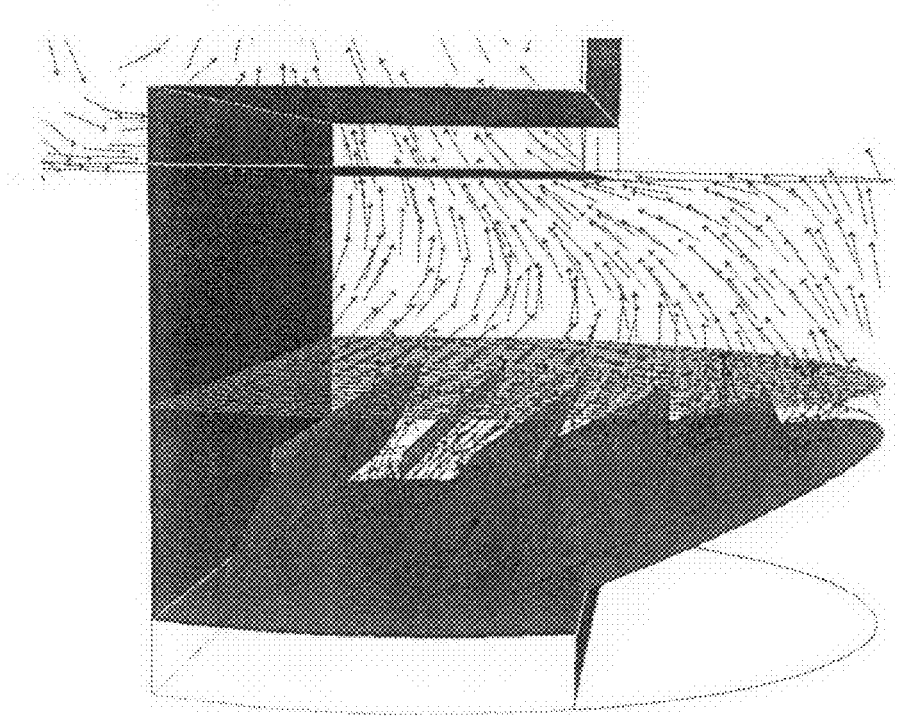
FIG. 6 represents the result of an out-flow simulation of the flows with a deflecting system mode of embodiment according to the invention (roof and deflecting plates appreciably parallel).

Without the system according to the invention (conventional column tray) a strong recirculation above the descending downspout is observed, which limits the useful section for passing the gas to the section corresponding to the active area SAA (FIG. 5). Implementing a tray according to the invention enables to redistribute the gas phase over the section that includes the active area and the area above the downspout, and no more recirculation is observed (FIG. 6).

The maximal speed of 1 m/s in zone (7) of FIG. 1 without the deflecting plate system drops to less than 0.8 m/s at identical gas flow rate. Considering that the maximal acceptable speed to avoid carrying droplets away is 1 m/s, this invention provides for a 30% gain on gas flow rate since, at a flow equal to 1.3 times the initial flow, the same maximal speed value is found in disengagement section (8) as in the case of the state of the art. It is a favorable case for a small column with a significant ratio of downspout surface/total column surface. This ratio generally ranges between 10 and 20%, achieving a capacity gain of +12.5% up to nearly 33% respectively.

The invention claimed is:

1. Gas-liquid contact column tray comprising a section including a gas pathway section and a liquid pathway section delimited by at least one downspout, wherein a deflecting system comprising a roof is included, located above the liquid gas interface above the liquid pathway section delimited by the at least one downspout, the roof being configured to apportion the gas phase over a surface section greater than the gas pathway section.

2. Tray according to claim 1 wherein the deflecting system comprises a plurality of elongate deflecting plates located higher than the downspout level, of which one plate forms said roof.

3. Tray according to claim 1 wherein roof is tilted in relation to vertical.

4. Tray according to claim 1 wherein the roof forms baffles including a main bottom part and a shorter bent top.

5. Gas-liquid contact column including at least one column tray according to claim 1.

6. Tray according to claim 1 wherein the roof comprises a continuous solid plate provided above the liquid gas interface and covering all of the liquid pathway section delimited by the at least one downspout.

7. Tray according to claim 6 wherein the deflecting system comprises a plurality of elongate deflecting plates located higher than the downspout level, of which one plate forms said roof.

8. Tray according to claim 7 wherein each of the deflecting plates forms a baffle including a main bottom part and a shorter bent top.

9. Tray according to claim 6 wherein roof is tilted in relation to vertical.

10. Gas-liquid contact column including at least one column tray according to claim 6.

* * * * *